United States Patent [19]

Haar

[11] 4,423,665
[45] Jan. 3, 1984

[54] MECHANICALLY CONTROLLABLE POWER BOOSTER

[75] Inventor: Lucas H. Haar, Niddatal, Fed. Rep. of Germany

[73] Assignee: ITT Industries, Inc., New York, N.Y.

[21] Appl. No.: 276,585

[22] Filed: Jun. 23, 1981

[30] Foreign Application Priority Data

Jul. 2, 1980 [DE] Fed. Rep. of Germany ....... 3024967

[51] Int. Cl.³ .............................. F15B 9/10; F16J 3/02
[52] U.S. Cl. ................................ 91/369 B; 91/376 R; 92/98 D; 92/165 PR
[58] Field of Search ................. 91/369 A, 369 B, 374, 91/387, 376 R; 60/547 R; 92/98 D, 165 PR

[56] References Cited

U.S. PATENT DOCUMENTS

| | | | |
|---|---|---|---|
| 4,334,459 | 6/1982 | Riedel et al. | 91/369 B |
| 4,347,779 | 9/1982 | Belart | 91/369 A |
| 4,353,287 | 10/1982 | Weiler | 91/369 A |

FOREIGN PATENT DOCUMENTS 1340699 12/1973 United Kingdom ............. 91/369 B

*Primary Examiner*—Robert E. Garrett
*Assistant Examiner*—Abram McConnell Bradley, IV
*Attorney, Agent, or Firm*—John T. O'Halloran; Alfred C. Hill

[57] ABSTRACT

In order to reduce the forces transmitted by the reaction device of a vacuum brake booster, there is provided a first booster piston directly connected to the booster's output member and a second booster piston of smaller size acting solely on the reaction device. Both booster pistons are controlled by a control valve carried by the second booster piston. The second booster piston is arranged inside an internal cylindrical sleeve penetrating the first booster piston and interconnecting the transverse end walls of the booster housing.

35 Claims, 5 Drawing Figures

MECHANICALLY CONTROLLABLE POWER BOOSTER

BACKGROUND OF THE INVENTION

The present invention relates to a mechanically controllable power booster, in particular for the actuation of a master brake cylinder for a hydraulic brake unit, comprising a housing having its transverse end walls interconnected by a reinforcement element having a tubular section extending through the housing interior; an axially movable piston arrangement subdividing the housing interior into a low-pressure chamber and a working chamber, the piston arrangement including a working piston encompassing the reinforcement element and a valve housing disposed within the tubular section and connected with the working piston, the valve housing containing a valve device for the purpose of controlling the pressure prevailing in the working chamber; and a reaction device supported on a force output member, the valve housing and a control element of the valve device and transmits part of the boosting force in opposition to the actuating direction onto the control element when the power booster is operated.

Power boosters of the type hereinabove described are characterized above all by low weight and a high amount of rigidity of the booster housing. Thanks to the reinforcement element extending through the housing interior, the forces to be absorbed and transmitted by the booster housing during operation will be received substantially by the reinforcement element so that the housing walls are relieved from load to a large degree and are permitted to be of a thin-walled and low-weight construction.

In a known power booster of the type referred to hereinabove, such as disclosed in British Pat. No. 2,022,209, the working piston is rigidly connected with the valve housing combining both parts to form a construction unit. The force output member provided by a push rod is movably held in the valve housing and bears against a rubber disc forming the reaction device. In this known power booster, the reaction device transmits the total amount of boosting force and is therefore required to be dimensioned correspondingly strong. Besides, special fastening elements are necessary to rigidly connect the working piston to the valve housing.

SUMMARY OF THE INVENTION

It is an object of the present invention to provide a power booster of the type referred to hereinabove having a reaction device which is loaded with only part of the boosting force.

A feature of the present invention is the provision of a mechanically controllable brake power booster comprising: a housing having a longitudinal axis; a reinforcement element disposed coaxial of the axis within the housing interconnecting both end walls of the housing transverse of the axis, the reinforcement element having a tubular section; an axially movable piston arrangement disposed in the housing subdividing the interior of the housing into a low-pressure chamber and a working chamber, the piston arrangement including a working piston encompassing the reinforcement element and a valve housing disposed within the tubular section, the valve housing containing a valve device for the purpose of controlling the pressure present in the working chamber; and a reaction device supported on a force output member, the valve housing and a control element of the valve device, the reaction device transmitting a portion of the boosting force onto the control element in opposition to the actuating direction when the booster is operated; the working piston bearing directly against the force output member; and the valve housing providing a second piston which is axially movable independently of the working piston and having a boosting force transmitted solely onto the reaction device.

By virtue of the present invention, a considerable part of the boosting force is transmitted from the working piston to the force output member directly without loading the valve housing and the reaction device. Therefore, these parts may be constructed less sturdy and lighter resulting in a reduction of weight and manufacturing costs of the power booster. In particular in the case of power boosters having a large effective diameter, this construction has a remarkable improvement as a consequence. It is another advantage of the present invention that there is no need for means to rigidly interconnect the working piston and the valve housing, which results in a simplification of the power booster's assembly.

In a preferred embodiment of the present invention, the working piston is rigidly connected with the force output member constructed as a push rod. This way, the working piston extends additionally through the piston rod, which is disposed in the master cylinder to be actuated by the power booster, so that the guiding of the working piston at the reinforcement element may be of straightforward construction. If the force output member is bend-resistantly coupled with a piston of a master cylinder to be actuated by the power booster, the guiding of the working piston is likewise able to be effected by the piston of the master cylinder. This improvement of the present invention may, however, also serve advantageously to guide the piston of the master cylinder additionally at the working piston and to simplify its guiding accordingly. In this arrangement, there will favorably result a length of the guiding which corresponds to the axial distance between the guiding surfaces at the master cylinder piston and the working piston. Preferably, the working piston is locked against rotation at the reinforcement element.

In a further favorable embodiment of the present invention, the working piston and the valve housing are guided by the reinforcement element in the axial direction. This obviates the need for a separate point of guiding for the working piston or the valve housing. Since the valve housing is preferably made from a thermoplastic resin having good sliding properties, it will be more favorable as a rule to have the working piston extend via the valve housing at the reinforcement element.

In a particularly straightforward embodiment of the present invention, the reaction device comprises two plate-shaped levers having their radially outward ends supported in the valve housing and their radially inward ends supported at the control element and abutting with their intermediate portion at webs at the working piston, or at the force output member, which webs form a tilting edge or fulcrum. In this arrangement, the webs are advantageously formed by legs of a support element having a U-shaped profile which latter support element is fastened at the working piston together with the force output member. To ensure a precise alignment of the webs relative to the plate-shaped levers, the working piston carries leaf springs transversely to the webs which springs abut the lateral edges of the levers. By virtue of these springs, the valve housing is simultaneously locked against rotation relative to the working piston.

To the end that the working piston and the valve housing are moved back to their off or rest position after an actuation of the power booster, a second return spring according to the present invention is arranged to urge the working piston against a stop defining its rest position. A first return spring having a lower spring force than the first return spring is clamped between the working piston and the valve housing and urges the valve housing against a second stop. It is particularly advantageous to have working piston and valve housing abut in their rest position at one common stop. This arrangement serves to limit the influence of manufacturing tolerances on the lost travel of the power booster. In accordance with the present invention the power booster is furthermore simplified advantageously in that the first return spring is inserted between the working piston and the levers of the reaction device, with the control element abutting in the off or rest position at a stop at the valve housing. According to this embodiment, the first return spring causes at the same time return of the control element to its rest position and prevents rattling of the levers which are not subject to load in this position.

In still another favorable embodiment of the present invention, the valve housing is guided with a first portion in the tubular section of the reinforcement element and with a second portion protruding from the booster housing in a sealed sliding guide in a transverse wall of the booster housing. This enables a favorable construction of the reinforcement element and achieves a long guide length for the valve housing.

To be able to keep the diameter of the portion of the valve housing which protrudes from the booster housing and, thus, the loss surface of the power booster as small as possible, this portion is formed by a sleeve manufactured separately from the valve housing, the fastening end of the sleeve including an annular collar which is fastened in the valve housing and maintains the fastening bead of a valve body at a shoulder of the valve housing. The advantage of this arrangement is that the connecting point between sleeve and valve housing is sealed by the fastening bead of the valve body and that an additional holding device for the valve body may be dispensed with.

Preferably, the valve housing and the working piston are sealed relative to the tubular section of the reinforcement element by means of rolling diaphragms being held with a fastening bead at each of the inside and the outside shoulder of a stepped enlarged portion of the reinforcement element. This provides for a simple and safe attachment of the rolling diaphragms at the reinforcement element and retains the loss surface caused by the reinforcement element at a low amount.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
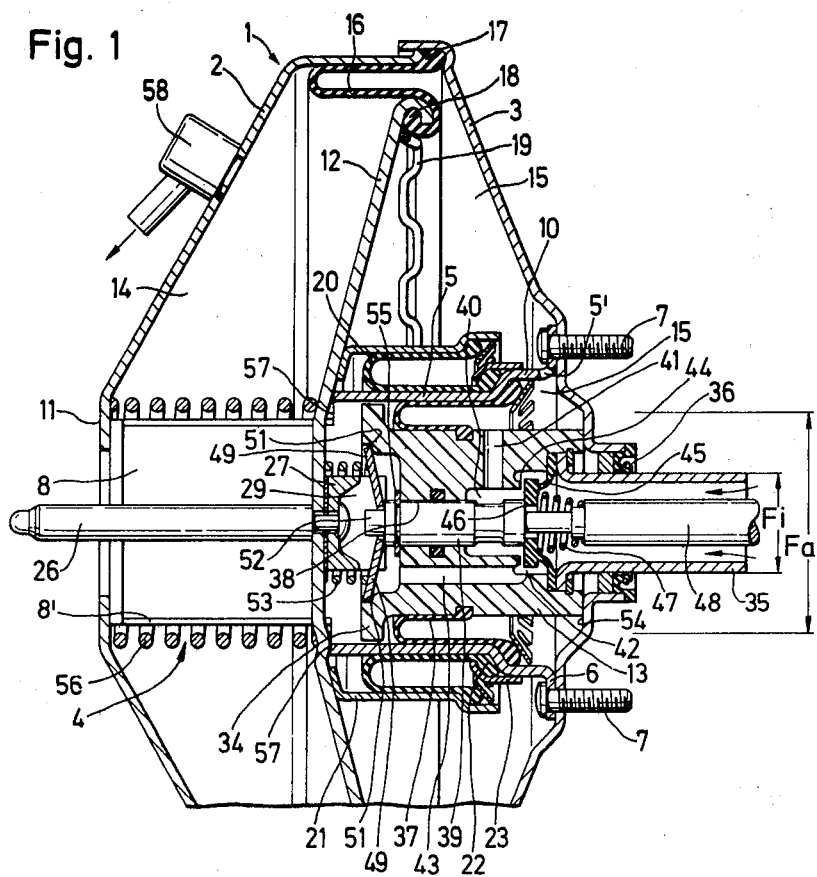
FIG. 1 is a longitudinal cross sectional view of a brake power booster in accordance with the principles of the present invention.
Figure 2:
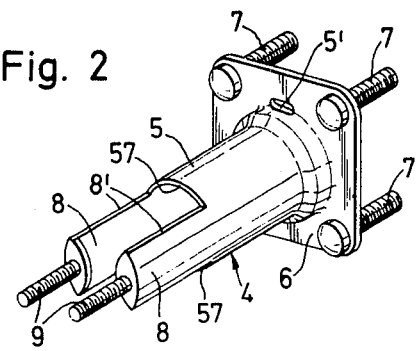
FIG. 2 is a perspective view of the reinforcement element of the brake booster of FIG. 1.
Figure 3:
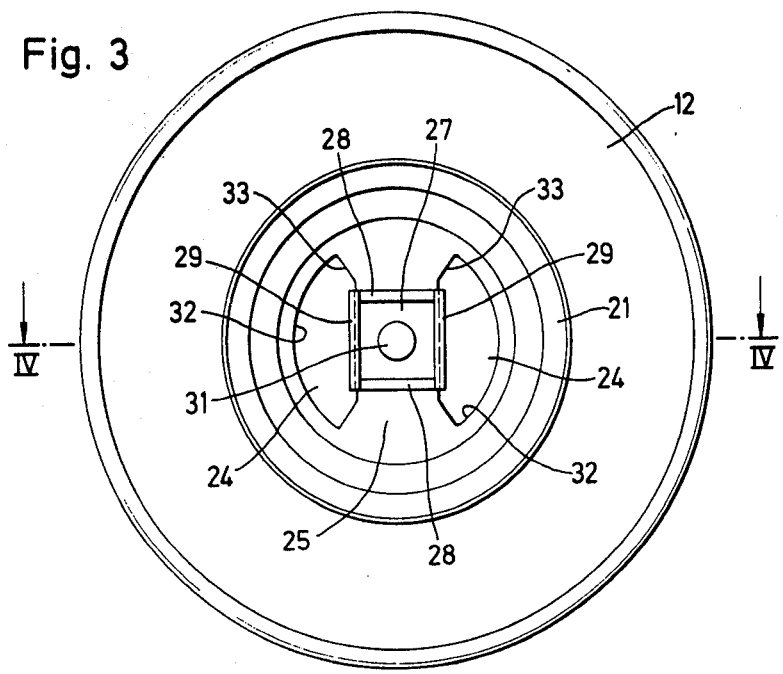
FIG. 3 is an end view of the working piston of the brake booster of FIG. 1 viewed in the actuating direction.
Figure 4:
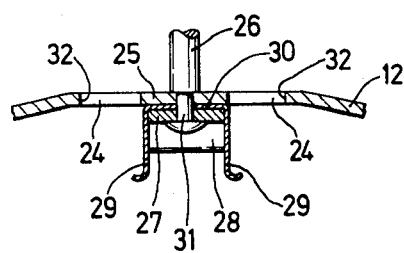
FIG. 4 is a partial cross sectional view of the working piston taken along the line IV—IV in FIG. 3.

Referring to FIGS. 1–5, the brake booster has a housing 1 which comprises two housing shells 2 and 3 of thin-walled sheet metal which are coupled at their outer edge by a bayonet connection. Extending coaxial of the longitudinal axis of housing 1 between housing shells 2 and 3 is a reinforcement element 4 including a tube 5 having disposing at one end thereof a flange 6 with fastening bolts 7 and at the other end thereof two connecting webs 8 with fastening bolts 9. The two connecting webs 8 are formed by an extension of tube 5 and isolated from one another by a board longitudinal slot. (See FIG. 2) A stepped enlarged portion 10 represents the transition from tube 5 to flange 6. Reinforcement element 4 is coupled to housing shells 2 and 3 by means of fastening bolts 7 and 9. Fastening bolts 7 are sealed in openings in housing shell 3 in a pressure-tight manner and serve to bolt the brake booster to carrier member, for example, the splashboard of an automotive vehicle. Fastening bolts 9 extend through bores in housing shell 2 and serve to attach a master brake cylinder (not shown) to the fastening surface 11. Seals provided between the master brake cylinder and fastening surface 11 ensure that housing shell 2 is sealed pressure-tight.

The interior of housing 1 is subdivided into a low-pressure chamber 14 and a working chamber 15 by a working piston 12 and a valve housing 13. The areas of working chamber 15 lying inside and outside of tube 5 are interconnected by an opening 5' in tube 5. At its periphery, working piston 12 is sealed by means of a rolling diaphragm 16 having its fastening bead 17 clamped in between housing shells 2 and 3. The rolling diaphragm 16 is held at working piston 12 by means of a bead 18 which is embedded in the beaded rim of working piston 12 and is there held by a wire ring 19 which is bent meander-like and inserted with preload. A second rolling diaphragm 20 seals working piston 12 relative to tube 5. The periphery of rolling diaphragm 20 is secured with a claw ring to an annular collar 21 of working piston 12. The inner fastening bead 22 of rolling diaphragm 20 is urged against the outer shoulder of enlarged portion 10 by a clamping ring 23. Working piston 12 includes in its middle two openings 24 (see FIG. 3) through which connecting webs 8 extend. At a web 25 between openings 24, a push rod 26 is fastened to working piston 12, push rod 26 forming the force output member of the brake booster and actuating the piston of the master brake cylinder (not shown). On the opposite side of web 25, a support element 27 of U-shaped profile is held at the web 25 with two webs 28 spaced from one another. On both sides of the support element 27, leaf springs are arranged transversely to webs 28 which springs are bent off from a common spring plate 30 (see FIG. 4). A pin 31 of the push rod 26 extends through web 25, spring plate 30 and support element 27 and is riveted at its end, thereby rigidly interconnecting the components mentioned.

By means of cylindrical surface sections 32, which are formed in openings 24, working piston 12 is slidably guided on the outer surfaces of connecting webs 8. The edges 33 at web 25 abut the lateral edges 8' of connecting webs 8 and thus lock working piston 12 against rotation.

The valve housing 13 is substantially of cylindrical shape and is made of thermoplastic resin. At the end of valve housing 13 close to working piston 12, valve housing 13 includes an annular collar 34 enabling valve housing 13 to be slidably guided within tube 5 and connecting webs 8. At its opposite end, valve housing 13 carries a sleeve 35 extending through an opening in housing shell 3 and being guided and sealed in this opening by means of a slide ring seal 36. the inner bead of a rolling diaphragm 37 is buttoned in a groove at the outer periphery of valve housing 13. The outer fastening bead of rolling diaphragm 37 abuts at a shoulder of tube 5, which shoulder is formed by enlarged portion 10, and is maintained in this position by a claw ring. Valve housing 13 accommodates a central bore 38 having a control element 39 slidably guided and sealed therein. Towards the sleeve 35, bore 38 is enlarged to form three steps. The first enlargement forms a valve chamber 40 communicating via a channel 41 with working chamber 15. The adjacent enlargement forms a valve chamber 42 connected to low-pressure chamber 14 by a channel 43. The shoulder between chambers 40 and 42 forms a valve seat 44. Valve chamber 42 is closed by a valve body 45 which is held at the shoulder neighboring valve chamber 42 by means of sleeve 35. In the inactive or rest position shown, valve body 45 bears against edge 46 of control element 39, which edge forms a further valve seat, while having lifted from valve seat 44 so that the two valve chambers 40 and 42 and, thus, also low-pressure chamber 14 and working chamber 15 will be in communication with each other. Valve body 45 is urged against edge 46 by a valve spring 47. Valve spring 47 is supported on an actuating rod 48 which rod abuts control element 39 and extends with its non-illustrated end projecting from sleeve 35 up to the brake pedal.

Figure 5:
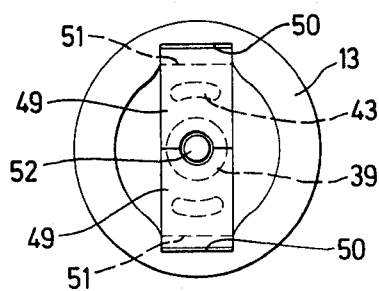
FIG. 5 is an end view of the valve housing with the reaction device of the brake booster of FIG. 1 viewed in a direction opposite to the actuating direction.

Provided between the working piston 12 and the valve housing 13 are plate-shaped levers 49 which form a reaction device (see FIGS. 1 and 5). The radially outward ends of levers 49 are placed in an indentation 50 in valve housing 13 and are supported on an edge 51 there. The radially inward ends of levers 49 abut at an end face of control element 39 being centered by a pin 52 disposed thereat. The intermediate portion of levers 49 lies opposite webs 28. Leaf springs 29 (see FIG. 4) abut the lateral edges of levers 49 and thereby arrange for a vertical alignment of levers 49 relative to webs 28. Clamped between levers 49 and working piston 12 is a return spring 53 which urges valve housing 13 in the illustrated position against a stop surface 54 at housing shell 3. In this arrangement, the force of spring 53 will be partly transmitted by control element 39, as a result of which control element 39 is held with a stop ring 55 in abutment with valve housing 13. Another return spring 56 is clamped between working piston 12 and housing shell 2, spring 56 urging working piston 12 against the end surface 57 of tube 5 forming a stop.

Via a connecting socket 58 at housing shell 2, low-pressure chamber 14 of the brake booster is connected with a low-pressure source, for instance, the suction port of a vehicle engine. The partial vacuum generated by the low-pressure source propagates in the illustrated inactive position of the brake booster into working chamber 15. When the brake booster is actuated by depression of the brake pedal, actuating rod 48 and with it control element 39 will be displaced in FIG. 1 to the left, when viewing the drawing. This causes valve body 45 to first move in abutment with valve seat 44 interrupting the connection between the two valve chambers 40 and 42. When edge 46 lifts from valve body 45 causing connection of valve chamber 40 to atmosphere via the interior of sleeve 35. At the same time, levers 49 swivelled by control element 39 in opposition to the force of return spring 53 will come into abutment with webs 28 which limits the opening movement of control element 39. The atmospheric air flowing in valve chamber 40 gets via channel 41 into working chamber 15 and acts upon both working piston 12 and valve housing 13. The effective surface of valve housing 13 corresponds to the annular surface resulting from the difference between the surfaces Fa and Fi.

By virtue of the actuating force introduced via the actuating rod and the pressure force acting on working piston 12 and valve housing 13, working piston 12 and valve housing 13 are moved to the left and actuate via push rod 26 the piston of the master brake cylinder. This action will last as long as the actuating force exerted on actuating rod 48 exceeds the reaction force generated by levers 49 in the event of the transmission of the pressure force of valve housing 13, which reaction force strives to slide control element 39 into valve housing 13. As soon as the reaction force prevails as a result of the progressive rise in pressure in working chamber 15, valve housing 13 will be displaced to the left relative to control element 39 until edge 46 abuts valve body 45. This causes discontinuance of the supply of atmospheric air so that there is no more rise in pressure in working chamber 15 and the brake booster is maintained in its actuating position. When the actuating force at actuating rod 48 is reduced, control element 39 will be moved further to the right by the reaction force at levers 49, as a result of which valve body 45 lifts from valve seat 44 and the pressure in working chamber 15 discharges into low-pressure chamber 14, so that the actuation of the master brake cylinder declines or will be terminated upon complete reduction of the actuating force.

In the absence of low pressure or when the maximum reaction force is exceeded in the run-out point by the actuating force, pin 52 will come into abutment with the rivet head of pin 31 and will, thus, render possible a direct transmission of the actuating force on actuating rod 48 via the push rod 26 to the master brake cylinder.

As is disclosed in the description of the brake booster of the present invention, the control is effected exclusively with the aid of the boosting force acting on valve housing 13, the magnitude of which boosting force—in relation to the transmission ratio formed by levers 49—determines the actuating force to be generated at actuating rod 48. Therefore, the construction of the brake booster in accordance with the present invention easily affords the possibility of obtaining different boosting ratios by variation of the diameter of working piston 12 without the overall dimensions and the load of valve housing 13 and control element 39 being changed. Instead of the levers described, the reaction device can be formed by a rubber disc as well. Due to the lower amount of load, this rubber disc could be advantageously of a smaller and a softer construction than is the case with the brake booster of the prior art.

While I have described above the principles of my invention in connection with specific apparatus, it is to be clearly understood that this description is made only by way of example and not as a limitation to the scope of my invention as set forth in the objects thereof and in the accompanying claims.

I claim:

1. A mechanically controllable brake power booster comprising:

a booster housing having a longitudinal axis;

a reinforcement element disposed coaxial of said axis within said booster housing interconnecting both end walls of said booster housing transverse of said axis, said reinforcement element having a tubular section;

an axially movable piston arrangement disposed in said booster housing subdividing the interior of said booster housing into a low-pressure chamber and a working chamber, said piston arrangement including a working piston encompassing said reinforcement element to provide a first boosting force and a valve housing disposed within said tubular section to provide a second boosting force, said valve housing containing a valve device for the purpose of controlling the pressure present in said working chamber; and a reaction device supported on a first return spring bearing against said movable piston arrangement coaxial of a force output member, said valve housing and a control element of said valve device, said reaction device transmitting said second boosting force onto said control element in opposition to an actuating direction when said booster is operated;

said working piston bearing directly against and applying said first booster force to said force output member; and said valve housing providing a second piston which is axially movable independently of said working piston to transmit said second boosting force solely onto said reaction device.

2. A booster according to claim 1, wherein
   said first output member is a push rod, and
   said working piston is rigidly connected to said push rod.

3. A booster according to claims 1 or 2, wherein
   said working piston is locked against rotation by said reinforcement element.

4. A booster according to claim 3, wherein
   said working piston and said valve housing are guided by said reinforcement element in an axial direction.

5. A booster according to claim 4, wherein
   said reaction device includes
   two plate-shaped levers each having an outer end abutting said valve housing, an inner end abutting said control element and an intermediate portion abutting webs disposed adjacent said working piston when said booster is active, said webs providing a fulcrum.

6. A booster according to claim 5, wherein
   said webs are provided by legs of a support element having a U-shaped profile, said support element being fastened to said working piston by a portion of said force output member.

7. A booster according to claim 6, further including leaf springs carried by said working piston, said leaf springs being disposed in a transverse relationship with said webs to abut lateral edges of said levers.

8. A booster according to claim 7, wherein
   said working piston is urged against a first stop by means of a second return spring disposed between said working piston and one of said end walls and said valve housing is urged against a second stop by means of said first return spring when said booster is inactive, said first spring having a spring force lower than said second spring.

9. A booster according to claim 8, wherein
   said first return spring urges said control element against a stop at said valve housing when said booster is inactive.

10. A booster according to claim 9, wherein
    said valve housing includes
    a first portion guided in said tubular section, and
    a second portion projecting from said booster housing and guided in a sealed slide guide disposed in one of said end walls of said booster housing.

11. A booster according to claim 10, wherein
    said second portion is provided by a sleeve distinct from said valve housing, said sleeve having an annular collar which is fastened in the interior of said valve housing and maintains a valve body in abutment with a shoulder at the interior of said valve housing.

12. A booster according to claim 11, further including
    a first rolling diaphragm to seal said working piston to said tubular section, said first diaphragm having a first fastening bead fastened to an outer surface of a step formed between said tubular section and an enlarged portion of said reinforcement element; and
    a second rolling diaphragm to seal said valve housing to said tubular section, said second diaphragm having a second fastening bead fastened to an inner surface of said step.

13. A booster according to claim 5, further including leaf springs carried by said working piston, said leaf springs being disposed in a transverse relationship with said webs to abut lateral edges of said levers.

14. A booster according to claim 13, wherein
    said working piston is urged against a first stop by means of a second return spring disposed between said working piston and one of said end walls and said valve housing is urged against said first stop by means of a second return spring when said booster is inactive, said first spring having a spring force lower than said second spring.

15. A booster according to claim 14, wherein
    said first return spring urges said control element against a stop at said valve housing when said booster is inactive.

16. A booster according to claim 15, wherein
    said valve housing includes
    a first portion guided in said tubular section, and
    a second portion projecting from said booster housing and guided in a sealed slide guide disposed in one of said end walls of said booster housing.

17. A booster according to claim 16, wherein
    said second portion is provided by a sleeve distinct from said valve housing, said sleeve having an annular collar which is fastened in the interior of said valve housing and maintains a valve body in abutment with a shoulder at the interior of said valve housing.

18. A booster according to claim 17, further including
a first rolling diaphragm to seal said working piston to said tubular section, said first diaphragm having a first fastening bead fastened to an outer surface of a step formed between said tubular section and an enlarged portion of said reinforcement element; and
a second rolling diaphragm to seal said valve housing to said tubular section, said second diaphragm having a second fastening bead fastened to an inner surface of said step.

19. A booster according to claims 1 or 2, wherein said reaction device includes
two plate-shaped levers each having an outer end abutting said valve housing, an inner end abutting said control element and an intermediate portion abutting webs disposed adjacent said working piston when said booster is active, said webs providing a fulcrum.

20. A booster according to claim 19, wherein said webs are provided by legs of a support element having a U-shaped profile, said support element being fastened to said working piston by a portion of said force output member.

21. A booster according to claim 20, further including leaf springs carried by said working piston, said leaf springs being disposed in a transverse relationship with said webs to abut lateral edges of said levers.

22. A booster according to claim 21 wherein
said working piston is urged against a first stop by means of a second return spring disposed between said working piston and one of said end walls and said valve housing is urged against a second stop by means of said first return spring when said booster is inactive, said first spring having a spring force lower than said second spring.

23. A booster according to claim 22, wherein
said first return spring urges said control element against a stop at said valve housing when said booster is inactive.

24. A booster according to claim 23, wherein
said valve housing includes
a first portion guided in said tubular section, and
a second portion projecting from said booster housing and guided in a sealed slide guide disposed in one of said end walls of said booster housing.

25. A booster according to claim 24, wherein
said second portion is provided by a sleeve distinct from said valve housing, said sleeve having an annular collar which is fastened in the interior of said valve housing and maintains a valve body in abutment with a shoulder at the interior of said valve housing.

26. A booster according to claim 25, further including
a first rolling diaphragm to seal said working piston to said tubular section, said first diaphragm having a first fastening bead fastened to an outer surface of a step formed between said tubular section and an enlarged portion of said reinforcement element; and
a second rolling diaphragm to seal said valve housing to said tubular section, said second diaphragm having a second fastening bead fastened to an inner surface of said step.

27. A booster according to claims 1 or 2, wherein
said working piston is urged against a first stop by means of a second return spring disposed between said working piston and one of said end walls and said valve housing is urged against a second stop by means of said first return spring when said booster is inactive, said first spring having a spring force lower than said second spring.

28. A booster according to claim 27, wherein
said first return spring urges said control element against a stop at said valve housing when said booster is inactive.

29. A booster according to claim 28, wherein
said valve housing includes
a first portion guided in said tubular section, and
a second portion projecting from said booster housing and guided in a sealed slide guide disposed in one of said booster end walls of said housing.

30. A booster according to claim 29, wherein
said second portion is provided by a sleeve distinct from said valve housing, said sleeve having an annular collar which is fastened in the interior of said valve housing and maintains a valve body in abutment with a shoulder at the interior of said valve housing.

31. A booster according to claim 30, further including
a first rolling diaphragm to seal said working piston to said tubular section, said first diaphragm having a first fastening bead fastened to an outer surface of a step formed between said tubular section and an enlarged portion of said reinforcement element; and
a second rolling diaphragm to seal said valve housing to said tubular section, said second diaphragm having a second fastening bead fastened to an inner surface of said step.

32. A booster according to claims 1 or 2, wherein
said valve housing includes
a first portion guided in said tubular section, and
a second portion projecting from said booster housing and guided in a sealed slide guide disposed in one of said end walls of said booster housing.

33. A booster according to claim 32, wherein
said second portion is provided by a sleeve distinct from said valve housing, said sleeve having an annular collar which is fastened in the interior of said valve housing and maintains a valve body in abutment with a shoulder at the interior of said valve housing.

34. A booster according to claim 33, further including
a first rolling diaphragm to seal said working piston to said tubular section, said first diaphragm having a first fastening bead fastened to an outer surface of a step formed between said tubular section and an enlarged portion of said reinforcement element; and
a second rolling diaphragm to seal said valve housing to said tubular section, said second diaphragm having a second fastening bead fastened to an inner surface of said step.

35. A booster according to claims 1 or 2, further including
a first rolling diaphragm to seal said working opiston to said tubular section, said first diaphragm having a first fastening bead fastened to an outer surface of a step formed between said tubular section and an enlarged portion of said reinforcement element; and
a second rolling diaphragm to seal said valve housing to said tubular section, said second diaphragm having a second fastening bead fastened to an inner surface of said step.

* * * * *